United States Patent [19]

Schroeder

[11] Patent Number: 4,625,274

[45] Date of Patent: Nov. 25, 1986

[54] MICROPROCESSOR RESET SYSTEM

[75] Inventor: Daniel R. Schroeder, Glen Ellyn, Ill.

[73] Assignee: Motorola, Inc., Schaumburg, Ill.

[21] Appl. No.: 611,252

[22] Filed: May 17, 1984

Related U.S. Application Data

[63] Continuation-in-part of Ser. No. 558,686, Dec. 5, 1983, abandoned.

[51] Int. Cl.⁴ .............................................. G06F 1/00
[52] U.S. Cl. .................................................. 364/200
[58] Field of Search ........................ 364/200 MS File

[56] References Cited

U.S. PATENT DOCUMENTS 4,328,578  5/1982  Bell et al. ............................ 370/100
4,486,827  12/1984  Shima et al. ......................... 364/200

Primary Examiner—Raulfe B. Zache
Attorney, Agent, or Firm—Phillip H. Melamed

[57] ABSTRACT

A wireless telephone communication system 10 is provided in which a portable unit 12 communicates with a base unit 11 over a wireless (radio) communication link 15. Access to a telephone network 15b by the portable unit 12, via the base unit 11, is permitted when the base and portable units have corresponding ID codes stored therein. The base ID code is hardwired into the base unit 11, and the portable unit 12 learns its ID code from the base unit in response to mechanically coupling the base and portable units together via plug and socket assemblies 28 and 45. The base and portable units each have associated microprocessors 22 and 40 which implement the transfer of an ID code to the portable unit from the base unit via conductors (24'-42') which are part of the plug and socket assemblies. The plug and socket assemblies, when mated, also provide a connection between a battery charging supply circuit 25 in the base and a battery 46 in the portable. Reset circuits 29 and 50 are provided in the base and portable units and control the resetting of the microprocessors 22 and 40.

14 Claims, 7 Drawing Figures

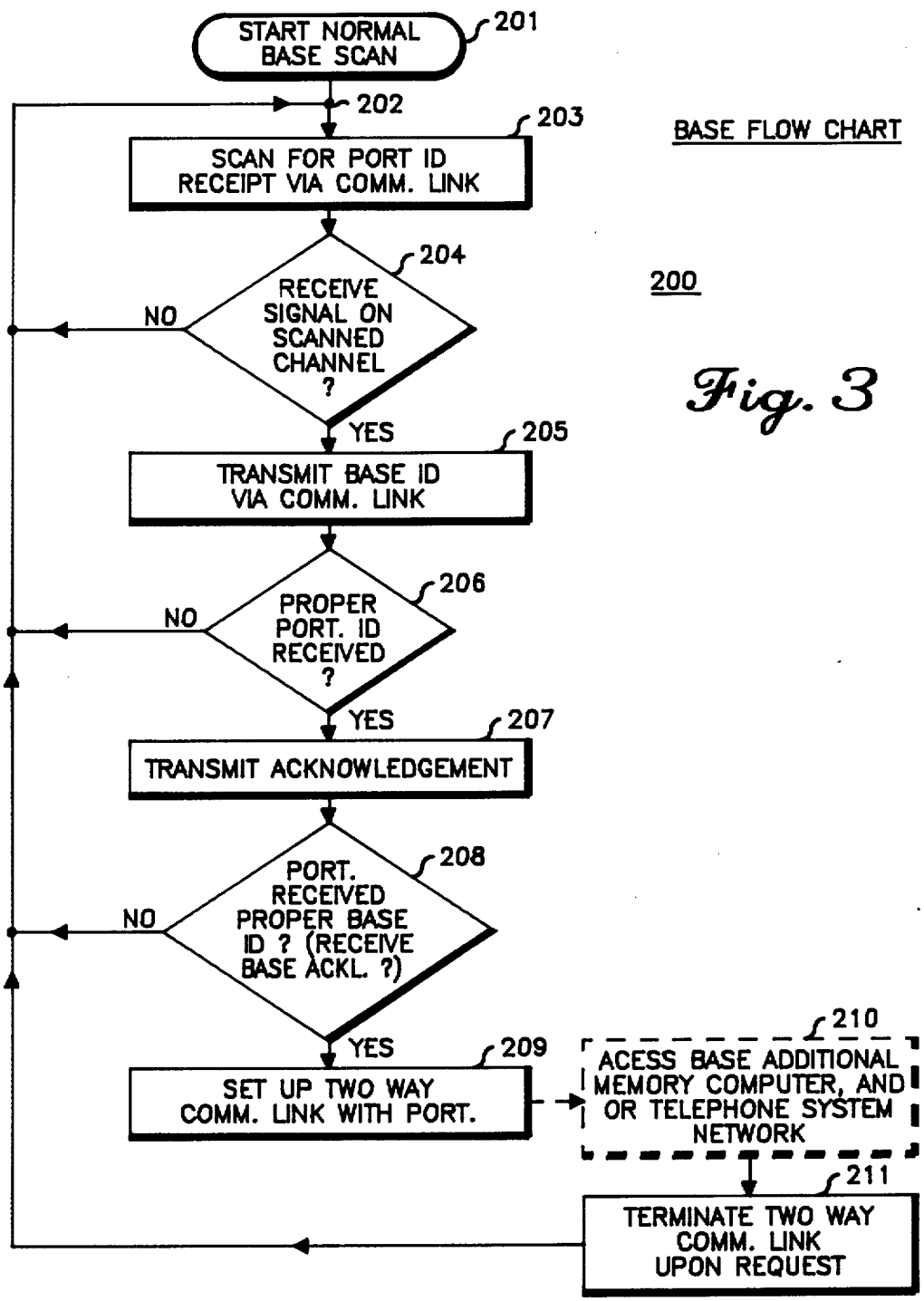

MICROPROCESSOR RESET SYSTEM

This is a continuation-in-part of U.S. application Ser. No. 558,686, filed Dec. 5, 1983, the priority of which is hereby claimed now abandoned.

BACKGROUND OF THE INVENTION

The present invention generally relates to the field of reset systems usable for resetting one or more microprocessors. More particularly, the present invention relates to a microprocessor reset system in which one microprocessor communicates with another via an information line and wherein each of the microprocessors is reset under certain condition.

Microprocessor reset systems exist wherein, in response to the occurrence of certain signal transitions, a reset pulse is provided to the microprocessor so as to interrupt its normal execution of commands and implement the execution of a different set of commands which form an interrupt subroutine. Typically, the reset pulse used to reset the microprocessor is provided in response to the occurrence of some event independent of and/or external to the microprocessor being reset. In some systems one microprocessor may transmit a signal which results in the resetting of another microprocessor. Some prior micropocessors are reset in response to the action of an independent timeout timer which provides a reset pulse at the reset terminal of the microprocessor.

In response to being reset, the microprocessor may provide, in some prior systems, a stream of information on an information output line separate from the reset terminal. Typically, the information line is not coupled to the reset terminal of the microprocessor, and this is to prevent the microprocessor from accidentally resetting itself in response to its output of information signals. This results in maintaining separate microprocessor information and reset lines. This can readily add to the cost of a microprocessor reset system when each of these lines has to be brought out external to the microprocessor package because access to the reset terminal is typically provided to an external apparatus and the microprocessor will typically communicate, via the information line, with an external apparatus which may comprise an additional microprocessor. When these separate external lines are connected from the microprocessor to external devices via plug and socket assemblies, the reliability of such a system is decreased since external plug and socket connectors for each of the separate external information and reset lines must be provided, and a faulty connection between any of these connector lines results in a system failure.

SUMMARY OF THE PRESENT INVENTION

An object of the present invention is to provide an improved microprocessor reset system which overcomes the aforementioned deficiencies of prior systems in that the information line on which the microprocessor will generate information data is also utilized as the signal input line to a reset circuit which results in resetting the microprocessor. Thus, since only a single conductor is utilized for both the information and reset connection external to the microprocessor circuitry, the present invention provides a more cost effective and reliable system than prior reset systems.

In one embodiment of the present invention there is provided a microprocessor system comprising: a microprocessor having a reset input terminal, an information line coupled to said microprocessor on which said microprocessor will transmit information data, and reset means coupled between said information line and said microprocessor reset terminal for providing a reset pulse to said microprocessor in response to an initial predetermined signal transition on said information line which is preceded by the existence of a predetermined voltage level which exists for a predetermined minimum duration of time, said reset circuit effectively ignoring subsequent substantially identical signal transitions which occur on said information line during said transmission of information data unless they are directly preceded by the existence of said predetermined voltage level which exists for at least said minimum duration of time.

Essentially the present invention comprises a base microprocessor which responds to a signal transition on an information line by virtue of a reset circuit providing a micropocessor reset pulse in reponse thereto. As part of the micropocessor interrupt subroutine produced in response to the reset of the microprocessor, the microprocessor provides information data on the information line. The reset cicuit effectively ignores this information data since the information comprises a rapidly varying signal which does not permit the existence of the predetermined voltage level on the information line for at least the minimum duration of time. This feature enables only a single combined external reset and data information line to be used with the base microprocessor and thereby eliminates the need for an external reset line which is separate from the information data line on which the microprocessor will transmit information.

Preferably, the reset circuit comprises long and short time constant charging circuits which utilize a capacitor such that the reset circuit operates as desired. Also preferably, the base microprocessor transmits a reset signal to a remotely located portable microprocessor on the information line and the portable microprocessor has its own reset circuit coupled between this information line and the reset terminal of the portable microprocessor. In addition, the portable microprocessor receives data information from this information line. The portable microprocessor reset circuit is constructed so as to differentiate between the portable reset signal provided on the information line by the base microprocessor and the data information which follows this reset signal. This is accomplished by having the portable reset circuit provide a portable reset pulse in response to the signal on the information line maintaining a predetermined voltage level for at least a minimum time duration, whereas during the subsequent transmission of information on the data line after the portable reset pulse, this condition is not met due to the control exercised by the base microprocessor which generates the data information. Preferably, the portable reset circuit includes a capacitor and resistor.

By utilization of the present invention an improved micropocessor reset system has been provided in which base and portable microprocessors can communicate with each other via a single information line and wherein reset pulses are developed for each of the microprocessors in response to appropriate signal transitions and the existence of voltage levels for minimum durations on the information line. Thus, by providing only a single connection between the base and portable microprocessors, the present microprocessor reset system allows communication between the microprocessors as well as the selective resetting of each of the microprocessors, and this is accomplished in a cost effective manner while avoiding any reliability problems created by relying on more than a single connection being provided between the microprocessors.

In the description of the preferred embodiments of the present invention provided herein, the operation of an entire base-portable communication system will initially be discussed prior to discussing the specific operation and construction of the present reset system. This is because the operation and advantages of the present reset system are best understood in conjunction with its utilization in such a communication system.

BRIEF DESCRIPTIONS OF THE DRAWINGS

For a more complete understanding of the invention reference should be made to the drawings, in which:

FIG. 3 is a flow chart of the operation of the base unit which results in the realization of desired communications between the base and portable units;

Figure 1:
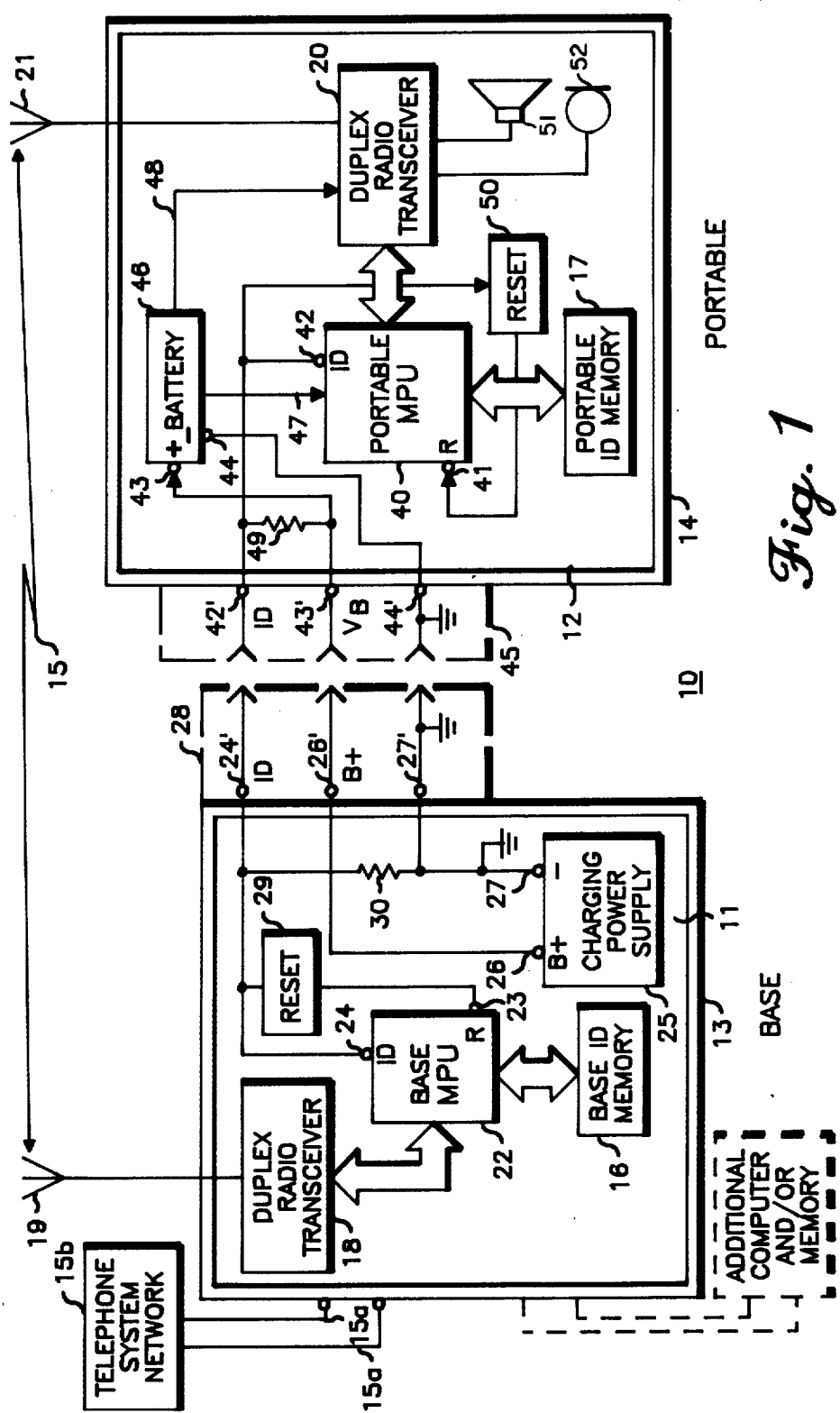
FIG. 1 is a schematic diagram of a communication system according to the present invention comprising base and portable communication units.
Figure 4A:
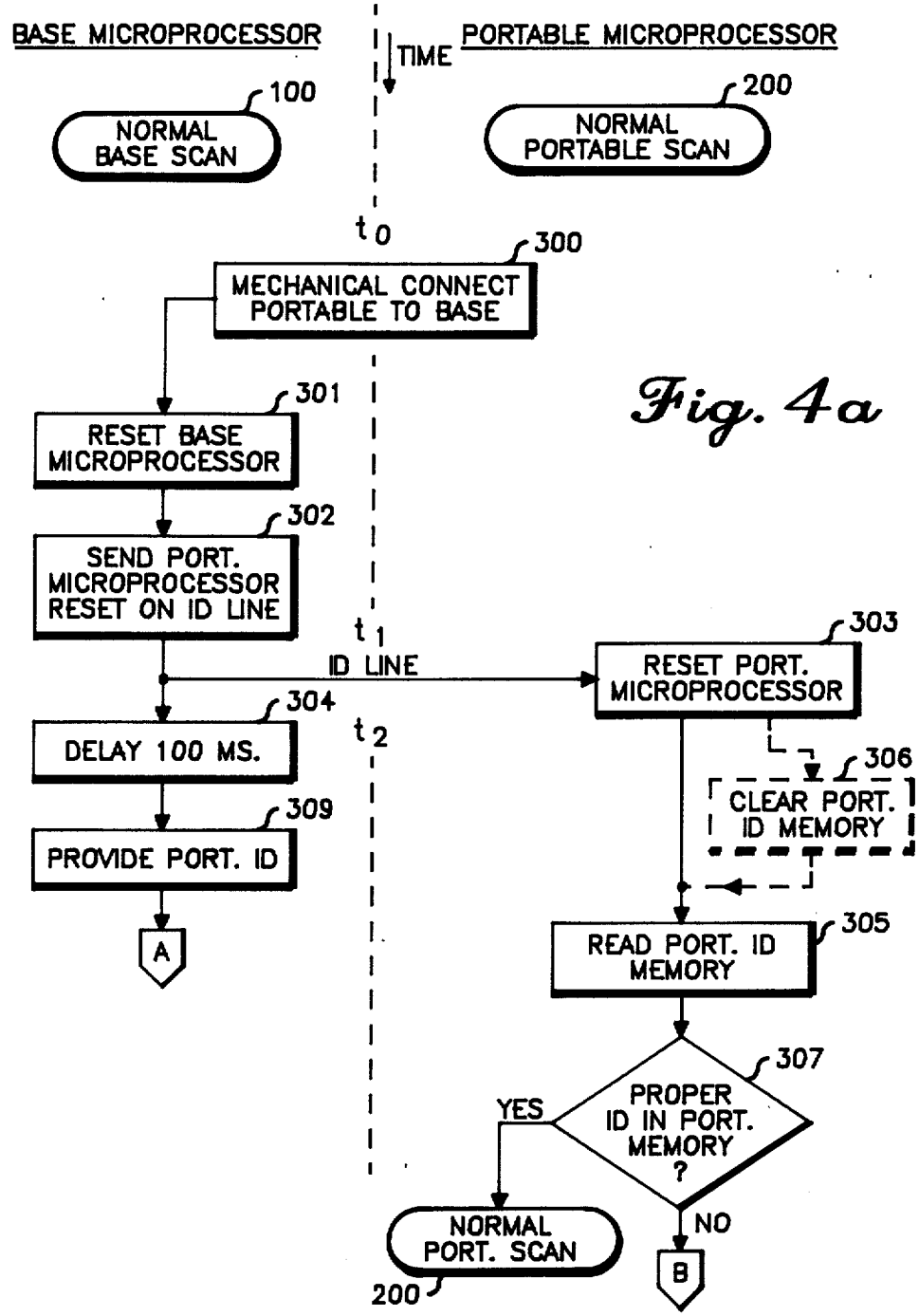
Figure 4B:
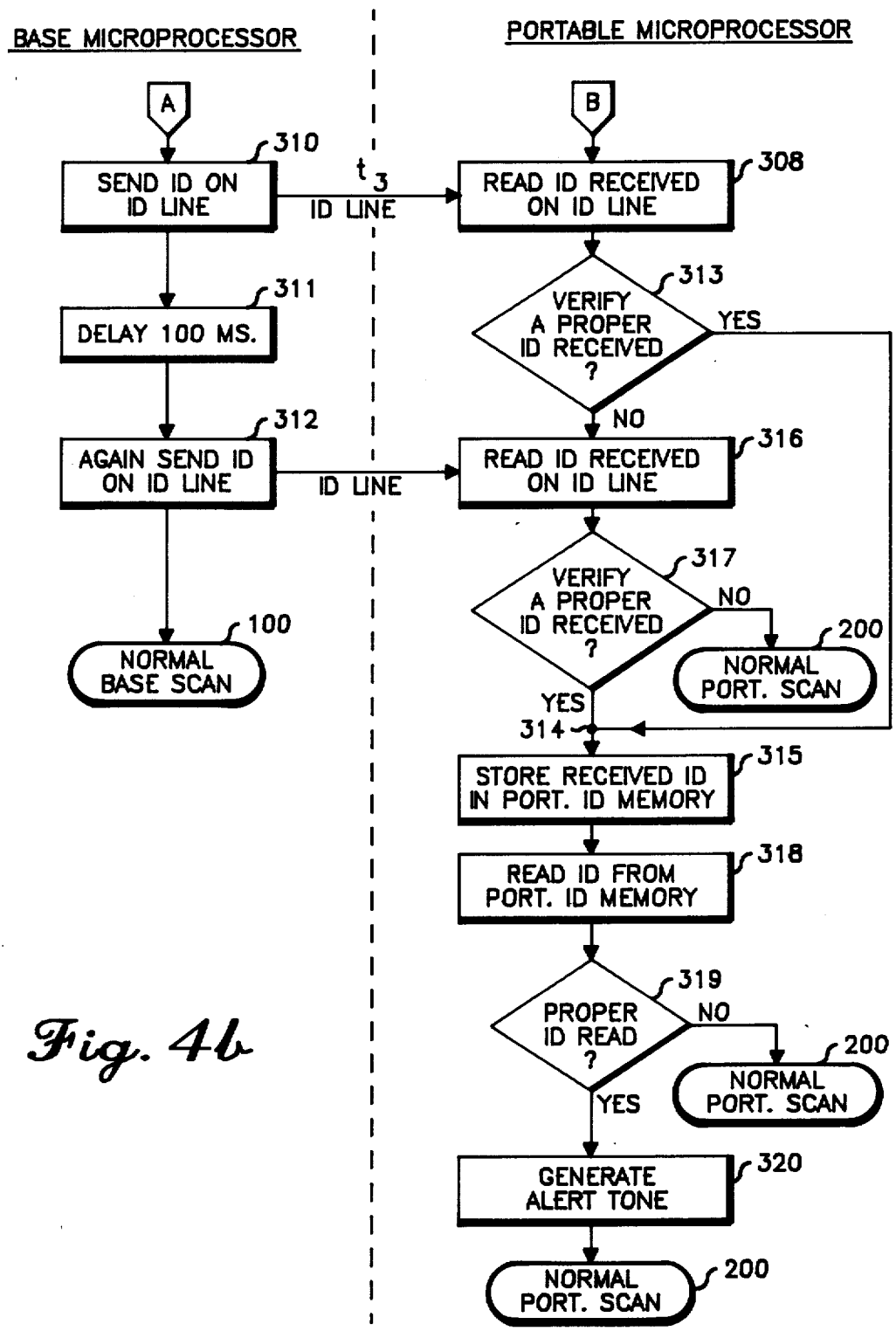
Figure 5:
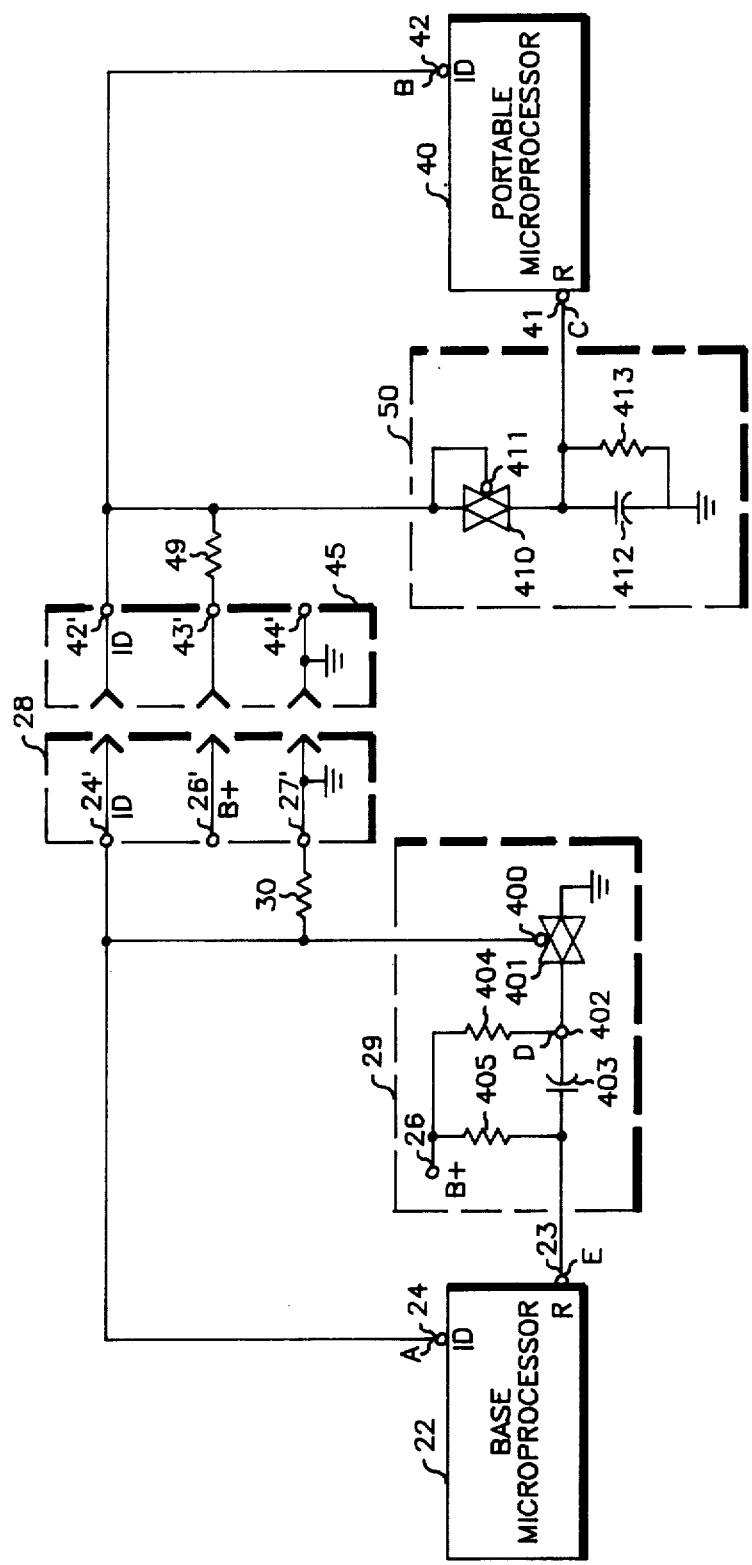
Figure 6:
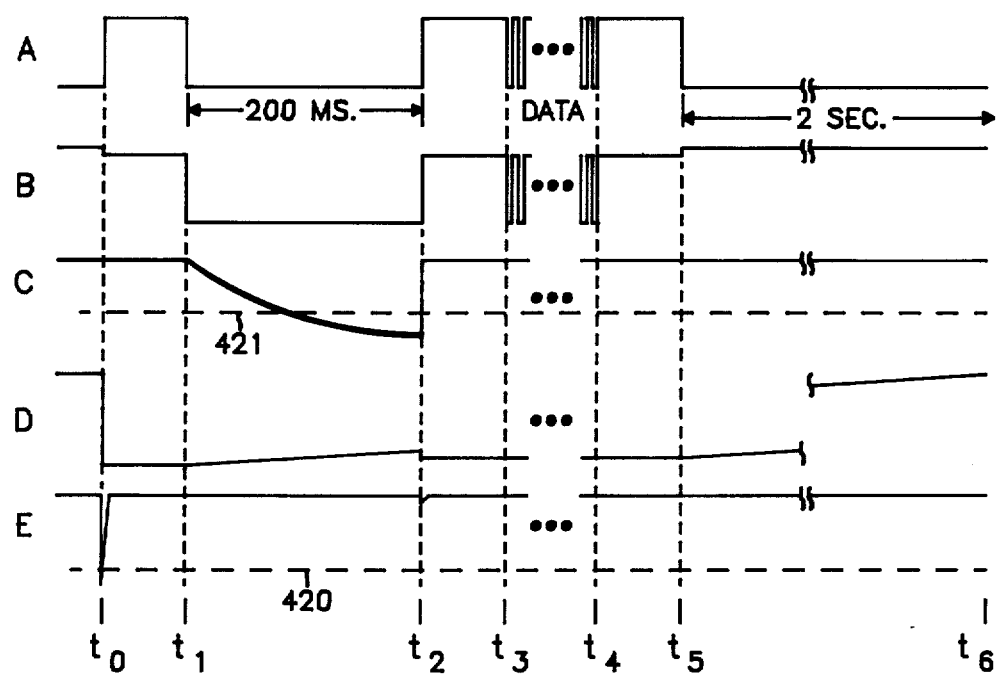

FIGS. 4a and 4b comprise a flow chart representative of the sequential steps which occur in response to a mechanical connection between the base and portable units whereby the portable unit learns its ID code;

FIG. 5 comprises a partial schematic diagram of the system of FIG. 1 illustrating the construction of reset circuits in the portable and base units; and FIG. 6 is a series of graphs illustrating the waveforms of signals provided by the communication system shown in FIGS. 1 and 5.

DESCRIPTION OF THE PREFERRED EMBODIMENTS

FIG. 1 illustrates a cordless (wireless) telephone communication system 10 comprising a base communication unit 11 and a portable communication unit 12 each having separate associated housings 13 and 14, respectively. The base communication unit 11 is located in a fixed location and is connected via standard telephone line connections 15a to a standard telephone system network 15b comprising various telephone exchange circuits and other base communication units and/or standard telephone receiving apparatus. In other words, the base communication 11 is coupled, via the lines 15a, into a standard telephone system so as to selectively provide access to the telephone system under certain conditions.

The base communication unit 11 has stored therein an associated base ID (identification) code. This code is stored in the form of one or more electrical signals in a base ID memory location 16 present within the base communication unit 11. A similar ID memory storage location 17 is present within the portable communication unit 12 and performs the function of storing a portable ID code, in the form of one or more electrical signals, which is associated with the portable communication unit 12. Obviously the locations 16 and 17 can comprise computer storage registers. At least when the housings of the base and portable communication units are separated from one another, and preferably even when the housings are joined via plug and socket assemblies, these units are capable of establishing a desired information communication therebetween on a wireless radio communication link 15. This information exchange on the communication link 15 occurs in response to circuitry in at least one of the base and portable communication units determining that the base and portable ID codes have the proper correspondence to one another.

Within the base communication unit 11 there is a duplex radio transceiver 18 whose output is provided to an antenna 19, and similarly within the portable communication unit 12 there exists a duplex radio transceiver 20 that receives inputs from a microphone 52 and provides outputs to an antenna 21 and a speaker 51. The base and portable radio transceivers 18 and 20 together with their associated antennas selectively establish the wireless communication link 15, and this occurs when the portable and base ID codes stored in the memory locations 16 and 17 have the proper correspondence to one another. Essentially the establishment of the wireless communication link 15 will occur when circuitry within the base and portable communication units determines that the base communication unit 11 has a base ID code in location 16 that is compatible with the portable ID code stored in the memory location 17. This event signifies that the portable unit 12 is intended for communication with the base unit 11 and that therefore proper communication between the portable and base units should be initiated over the wireless communication link 15. The reason for requiring correspondence of the ID codes of the portable and base is for security purposes such that only portable units having the proper ID code in their memory location 17 can establish desired information communication to the base unit 11 via the communication link 15.

The base communication unit 11 includes therein a base microprocessor (MPU) 22 which is connected to the radio transceiver 18 for control thereof and also for analysis of the information received by the radio transceiver 18. In addition, the base microprocessor 22 is directly coupled to the base ID memory storage location 16 which may actually form part of the base microprocessor 22. The microprocessor 22 has a reset terminal 23 wherein in response to a low signal level provided at the terminal 23 the base microprocessor will interrupt its normal sequence of operations and execute a reset subroutine of instructions. The base microprocessor 22 has an ID output terminal 24 at which the microprocessor will selectively provide a sequence of signals which will include an ID code that is to be transferred to the portable communication unit 12.

Within the housing 13 of the base communication unit 11 there exists a charging power supply circuit 25 which provides a positive charging voltage at a B+ terminal 26 and a ground voltage at at terminal 27. The B+ terminal 26, the ground terminal 27 and the ID terminal 24 are directly connected to corresponding terminals designated by prime notation which are external to the housing 13 which form conductors in a plug assembly 28 of a plug and socket assembly. The plug assembly 28 comprises extending electrical projections corresponding to the terminals 24', 26' and 27' which are mechanically fixed to the base communication unit housing 13. A reset circuit 29 is present within the base unit 11 and is connected between the ID terminal 24 and the reset terminal 23. A grounding resistor 30 is connected between the ID terminal 24 and the ground terminal 24 so as to maintain the ID terminal at ground potential whenever the microprocessor 22 does not provide a voltage potential at the ID terminal 24 different from ground and whenever the plug assembly 28 of the plug and socket assembly is not mated to its corresponding socket assembly.

The portable communication unit 12 includes therein a portable microprocessor 40 which is directly coupled to the duplex radio transceiver 20 for providing control thereof and for identification of information received by the transceiver 20. The microprocessor 40 includes a reset terminal 41 and an ID input terminal 42. In response to a low voltage present at the reset terminal 41, the microprocessor 40 will interrupt its normal sequence of execution of control statements and implement a predetermined interrupt subroutine. The ID terminal 42 of the microprocessor is used for providing ID code signals to the microprocessor wherein these signals may result in the microprocessor storing ID signals in the portable ID memory location 17 which is directly connected to the microprocessor 40. The ID terminal 42 in the portable communication unit is directly connected to a corresponding ID terminal designated 42' which together with a battery voltage terminal 43' and a ground potential terminal 44' are external to the housing 14 and comprise conductors of electrical socket receptacles that form part of a socket assembly 45 of the plug and socket assembly. The socket assembly 45 is rigidly attached to the portable housing 14 and mates with the corresponding plug assembly 28 of the base unit 11.

The battery voltage terminal 43' is directly connected to a positive voltage terminal 43 of a battery 46 within the portable communication unit 12 while the ground terminal 44' is directly connected to a negative terminal 44 of the battery 46. The battery provides operative power to both the portable microprocessor 40 and the duplex radio transceiver 20 via connections 47 and 48 within the portable communication unit 12. The ID terminal 42 is connected through a resistor 49 to the positive battery terminal 43, and the ID terminal 42 is connected through a reset circuit 50 to the reset terminal 41 of the portable microprocessor.

Figure 2:
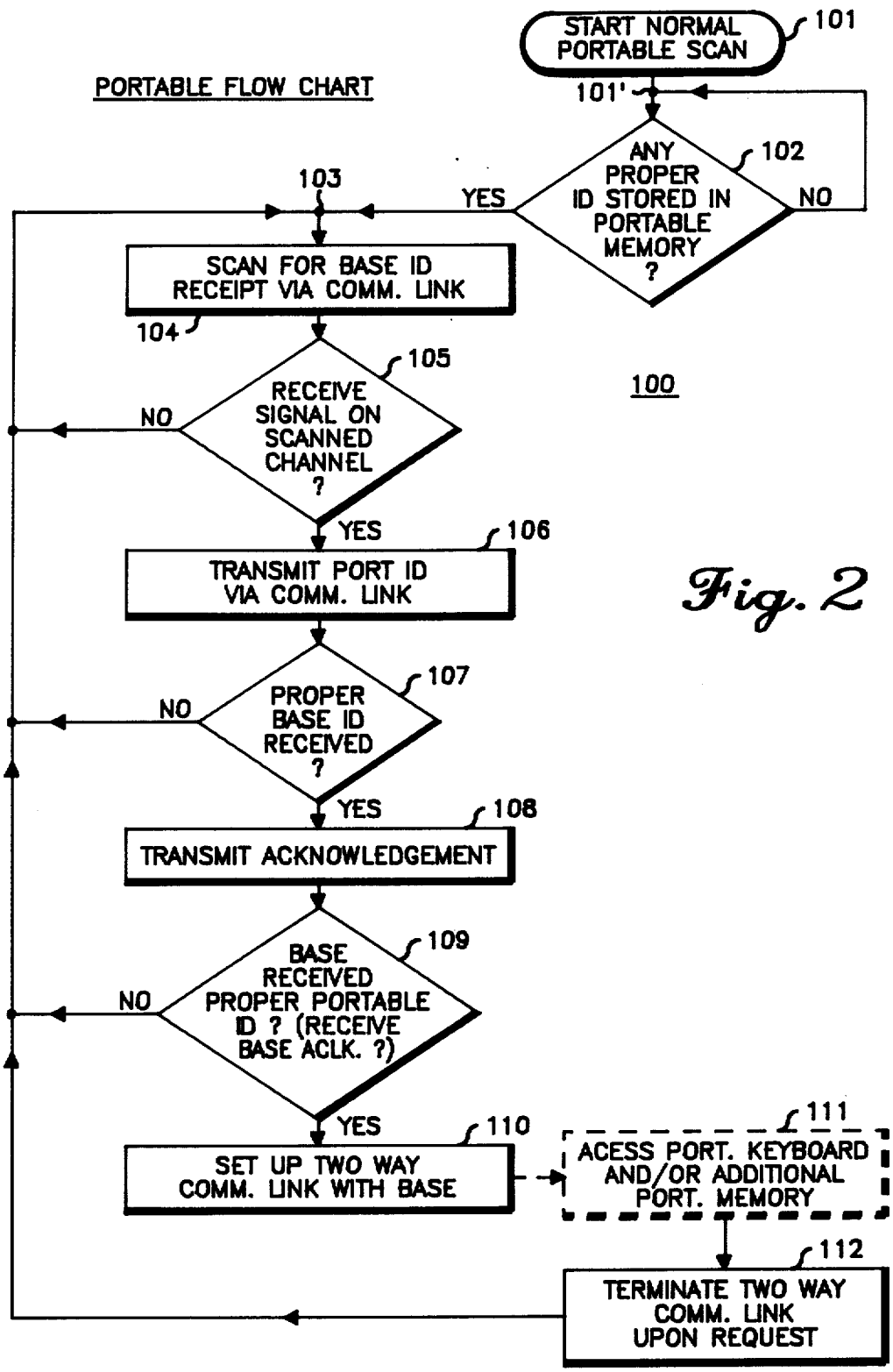
FIG. 2 is a flow chart of the operation of the portable unit representing the manner in which desired communications with the base unit are realized.

The operation of the base and portable communication units 11 and 12 will now be discussed with respect to the information flow charts shown in FIGS. 2 through 4 which illustrate the normal operation of these units and their operation in response to the mechanical connection of the portable unit to base unit via the connecting of the plug and socket assemblies 28 and 45. It should be noted that FIGS. 2 and 3 illustrate the operation of typical portable-base communication systems requiring code identification. FIG. 4 will illustrate how the present invention provides, upon the mechanical connection of the plug and socket assemblies, that the base microprocessor 22 will recognize the occurrence of this event and, in response thereto, provide a reset signal followed by a predetermined code at the base ID terminal 24 which will result in resetting the portable microprocessor 40 and reading into the portable memory location 17 a desired portable ID code. After the portable ID memory location 17 has received a proper portable ID code, then full communication between the base and portable communication units will be possible via the communication link 15.

Refering now to FIG. 2, a normal portable channel scanning routine 100 begins at an initalizing step 101. It is understood that the routine 100 is executed when the portable unit 12 is attempting to find out if a base unit is trying to initiate communication with it via link 15. If the portable unit is to initiate communication to a base unit then routine 100 is not executed and the portable unit first finds an open channel on the communication link 15 and then transmits an ID code, if a proper ID code is located in memory location 17, on the open channel. Control then reenters the flow chart 100 prior to block 107. Since this mode of operation substantially corresponds to standard mobile telephone operation it is not illustrated by flow charts herein. Information flow from 101 passes to a summing terminal 101' and then on to a decision block 102 which determines if the portable ID code stored in the portable ID memory location 17 corresponds to a proper ID code which might enable the portable communication unit 12 to set up communications with a base communication unit. If the portable memory location 17 does not contain a proper stored ID code, then information flow proceeds back to the summing terminal 101' for subsequent reexecution of the decision block 102. If a proper ID code is stored in the portable memory location 17, information flow proceeds to a terminal 103.

Essentially the decision block 102 corresponds to the portable microprocessor 40 reading out the electrical signals stored in the portable ID memory location 17 and determining if these signals correspond to any allowable code which might result in the portable unit having a ID code stored in location 17 which is compatible with a base ID code. This step can be accomplished by the portable microprocessor 40 performing a parity check on the code stored in the location 17 or by comparing the stored code to insure that it falls within the numerical limits of the range of allowable ID code values which have been preset into the portable microprocessor 40. The implementation of the decision block 102 can be routinely performed by well known microprocessor numerical comparison program steps, and can even be performed by digital signal comparators which compare various digital electrical signals. The function of the decision block 102 is to insure that unless a proper identification code is located in the memory location 17, the portable communication unit 12 will not attempt to initiate communication with any base unit via the wireless communication link 15.

If a proper ID code is stored in the memory location 17, control passes from the terminal 103 to a process block 104 and then to a decision block 105 which results in activating the duplex radio transceiver 20, scanning communication link channels and investigating if the transceiver has received any base ID code at the antenna 21 via the communication link 15. Thus the process block 104 corresponds to the microprocessor 40 enabling the duplex radio transceiver 20 to receive signals from a channel of the communication link 15 and block 105 investigates if these received signals comprise a base ID code. Each time block 104 is entered a next sequential channel is scanned. It is contemplated that the duplex radio transceiver 20, as well as the duplex radio transceiver 18 comprise 40 channel scanning radio transceivers wherein each of 40 channels is scanned sequentially until a signal is received on that channel. Of course single channel operation is also possible for the transceivers 18 and 20. Once a signal is received on the channel being scanned by the transceiver 20, control passes from 105 to a process block 106 which results in the transceiver 20 transmitting, on a corresponding channel via the communication link 15, a code corresponding to the portable ID code stored in the memory location 17. If block 105 determines that no signal is received on the scanned channel, control passes to terminal 103, and then to block 104. It should be noted that preferably full duplex operation of the transceivers 18 and 20 is contemplated which enables the simultaneous operation of the receiver and transmitter portions of the transceivers. Simplex operation of the transceivers is also possible.

After the transmission of the ID code by block 106, which is initiated by the microprocessor 40 activating the transmitter portion of the transceiver 20 and providing an ID code corresponding to the code stored in the memory location 17 to the transceiver for transmission, control passes to the decision block 107 which determines if a base ID code corresponding to the portable ID code in location 17 was received by the portable communication unit 12. The identifying of the received base ID code at the antenna 21 via the communication link 15 corresponds to the microprocessor 40 investigating the signals received to determine if they correspond to the portable ID code stored in the memory location 17. If this is not the case, control then passes to the terminal 103 since the microprocessor 40 has identified that the base unit which is transmitting to the radio transceiver 20 is not the one for which the portable unit 12 is permitted to communicate with. Under these circumstances control passes to the process block 104 which steps the transceiver 20 to the next sequential channel of the communication link 15.

If, via block 107, the microprocessor 40 identifies the received base ID code as corresponding to the stored ID code in the memory location 17, control effectively passes to a subsequent process block 108 wherein the microprocessor 40 causes the transceiver 20 to transmit an acknowledgement signal indicating the portable unit has received, via the link 15, a proper ID code. Control then passes to decision block 109 wherein the microprocessor 40 investigates if the base communication unit 11 has received the portable ID code transmitted by the process block 106 and has determined that the base is to communicate with the portable communication unit 12. This essentially comprises the microprocessor 40 determining if the base unit 11 has transmitted an acknowledgement signal via the communication link 15 in response to its reception of a proper corresponding ID code and if this acknowledgement signal has been received by the transceiver 20. If no acknowledgement is received, again control passes to the terminal 103 and the scanning for a transmission by a proper base unit continues on the next sequential channel of link 15.

Once a proper acknowledgement signal from the base unit is received, control passes from block 109 to a process block 110 which results in setting up a full two way communication link between the portable unit 12 and the base unit 11. This comprises allowing the free full exchange of information between the portable and base units via the communication link 15 wherein this step may include, as shown dashed in FIG. 2, an additional process block 111 comprising allowing the duplex radio transceiver 20 to then access a portable keyboard, a microphone, and/or additional memory within the portable communication unit 12. When communications between the portable and base units is desired to be terminated, control passes to a process block 112 which terminates the communication link 15 upon the request of either the end user of the portable unit 12 or upon the termination of the signal from the base unit 11, or any of a number of other conditions.

Essentially the flow chart in FIG. 2 is merely representative of known information transfer schemes between coded portable and base communication units over a communication link. In such known systems, communication between the portable and base units is initiated only in response to circuitry in at least one of the portable or base units identifying the correspondence between the portable and base identification codes. After the portable unit identifies the correspondence, it transmits an acknowledgement signal to the base unit, and once it receives a similar acknowledgement from the base unit it will set up a full two way communication link between the portable and base units since the compatibility of their stored ID codes has been verified. This operation is substantially identical to known remote (mobile) telephone system. The acknowledgement function between base and portable units is commonly referred to as a "hand shake" and is well known in the field of communication systems between base and remote computer stations. It is contemplated that the termination of the communication link 15 would occur in response to the duplex radio transceiver 20 receiving a termination command from a base communication unit 11 which is identified as a termination request by the portable microprocessor 40 that monitors the information received by the transceiver 20, or the elapsing of a predetermined amount of time without any information exchange between the portable and base units occurring wherein preferably hand shake acknowledgement signals occur between these units periodically to maintain the communication link 15 when information exchange is to continue.

FIG. 3 illustrates a flow chart diagraming an information flow subroutine 200 for the base communication unit 11 similar to the subroutine 100 shown in FIG. 2. It should be noted that subroutine 200 corresponds to the base unit searching for a portable initiated transmission on link 15. If the base is to initiate communication via link 15, a different subroutine is executed comprising the base finding an open channel and transmitting an ID code thereon. Then the base unit essentially rejoins the flow chart 200 prior to the decision block 205.

The flow chart 200 is entered at an initializing point 201 and procedes to a summing terminal 202 and from there to a process block 203 which provides for sequential scanning of the various channels of the communication link 15 for receipt of a portable ID code via the transceiver antenna 19.

Information flow then passes to a decision block 204 which determines if a signal is being received on the scanned channel. If not control passes to the terminal 202 which will result in block 203 scanning the next sequential channel. If a signal is received on the scanned channel control passes to a process block 205 which results in the base communication unit 11 transmitting, on the scanned channel, an ID code corresponding to its base ID code via the commuication link 15. Again scanning operation over 40 channels is contemplated for the base radio transceiver 18 just as such scanning over 40 channels is contemplated for the portable radio transceiver 20. However, the present invention is still operative even if only one communication channel is provided.

From the process block 205 control passes to the decision block 206 where the base microprocessor 22 inquires if a proper ID code has been received by the transceiver 18. If no such proper code has been received which is compatible with the base ID code stored in the memory location 16, then information flow returns to the terminal 202 so that the next channel in communication link 15 will be scanned. If the decision block 206 determines that a compatible portable ID code has been received, control passes to a process block 207 which transmits an acknowledgement signal via the communication link 15 and control then proceeds to a decision block 208 which essentially inquires if the portable communication unit 12 has transmitted an acknowledgement signal. If no such acknowledgement signal is received from the portable communication unit, again control returns to the terminal 202 and the base unit will continue searching for transmissions from a portable unit whose code is compatible with the base code and which has received and properly identified the base communication unit 11 transmitted code.

If the decision block 208 determines that the portable unit has acknowledged the receipt of a proper code from the base unit, then control passes to the process block 209 which sets up full two way communications between the portable and base units. As indicated dashed in FIG. 3 this can include a process block 210 which will now enable the portable unit, via the base unit, to access additional base memory locations and/or computer apparatus and/or the telephone system network 15b. Thus essentially the process block 210 results in the base communication unit 11 providing a connection between the portable communication unit 12 and the telephone system network 15b wherein this will only occur in the event of correspondence between the portable and base ID codes stored in the memory locations 16 and 17.

Since access to the standard telephone system network 15b is provided by block 210 via a cordless portable telephone unit 12, of course the present system requires security such that access to the telephone system network or proprietary memory locations and computer apparatus associated with the base communication unit 11 is not provided to every portable communication unit regardless of the code stored in its portable ID memory location 17. The present embodiment provides a cost effective and desirable way of retaining the security of the system 10 by insuring that only portable units which have physically been mated to the base communication unit 11 will have a predetermined ID code that will enable communication between these portable and base units. In FIG. 3, after the process block 210, control passes to the process block 21 which will implement a termination of the two way communication link 15 either upon request of signals by the base unit 11 or the portable unit 12 wherein again this could comprise the lack of a periodic hand shake between these devices after a predetermined period of time when typically such a hand shake would occur within this time period due to the operation of the base and portable microprocessors 22 and 40.

As was noted before in connection with the FIG. 2 flow chart, the FIG. 3 flow chart again is merely the flow chart of typical communication systems which exist. These flow charts correspond to systems such as portable and remote computers which only permit full exchange of information upon microprocessors in each location identifying that the portable and remote units have identification codes which correspond. In this respect it should be noted that while the base and portable identification codes could be precisely identical, of course a different code could be utilized for the base ID code than is utilized for the portable ID code as long as correspondence between these codes is determined by the microprocessors. Thus a base ID code corresponding to the numeral 215, for example, may correspond to a portable ID code corresponding to the numeral 327, for example, where in the correspondence between these codes could be determined by read only memory (ROM) decoders which precede digital signal comparators. It should also be noted that some of the specific sequence of operations shown in the flow charts in FIGS. 2 and 3 could be altered and still obtain a viable communication system.

As was previously noted, the present embodiment comprises a communication system corresponding to the one shown in FIGS. 1 through 3 wherein a unique method is illustrated for providing the portable ID code located in the memory location 17. FIGS. 4a and 4b together illustrate a hybrid base-portable flow chart which describes the operation of the base and portable communication units upon the mating of the plug and socket assemblies 28 and 45. The left side of FIGS. 4a and 4b illustrate the operation of the base communication unit 11 while the right side illustrates the operation of the portable communication unit 12. Time proceeds from top to bottom in FIGS. 4a and 4b.

Prior to the mating of the plug and socket assemblies 28 and 45, assemblies, it is contemplated that the base and portable units will be implementing their normal base and portable scanning subroutines 100 and 200. At a time $t_0$, the housings of the portable and base units are mechanically connected together via the mating of the rigidly attached plug and socket assemblies 28 and 45. Due to the physical connections shown in FIG. 1, this will obviously result in the charging power supply circuit 25 commencing charging of the portable battery 46. The event of connecting the portable to the base unit is indicated at time $t_0$ by the process block 300 in the flow chart in FIG. 4a. From process block 300, control passes to the process block 301 wherein the reset circuit 29 senses the connection of the plug and socket conductors corresponding to the ID terminals 24' and 42' and provides a reset signal at the terminal 24 to reset the base microprocessor 22. The circuitry which comprises the reset circuit 29 is shown in FIG. 5 and this circuitry will be explained subsequently in connection with the waveforms shown in FIG. 6. The resetting of the base microprocessor 22 interrupts the base scan routine 100 and causes the microprocessor to implement the new instructions illustrated in FIGS. 4a and 4b.

From the process block 301 control passes to the process block 302 which represents the base microprocessor 22 providing at the terminal 42' a portable microprocessor reset signal via the connection of the plug and socket terminals 24' and 42' of the assemblies 28 and 45. This corresponds to the base microprocessor, upon reset, generating a relatively long low signal output at its ID terminal 24 which is transmitted via the mechanical and electrical connection of the plug and socket assemblies 28 and 45 to the portable reset circuit 50 that identifies this relatively long low output signal and provides a reset signal at the terminal 41 in response thereto. The sending of the low reset signal from the base microprocessor to the portable microprocessor on the ID line (across terminals 24' and 42') occurs between the times $t_1$ through $t_2$, and the portable microprocessor is reset as indicated by the process block 303. Also at this time a 100 millisecond delay is provided by the base microprocessor 22 via a process block 304.

In a manner similar to the implementation of the base microprocessor reset block 301, when the portable microprocessor 40 is reset via the block 303, execution of the normal portable scan routine 200 is interrupted and a new set of instructions is executed by the portable microprocessor as shown in FIGS. 4a and 4b. From the portable process block 303, two separate paths of information flow are indicated in FIG. 4a. The solid path directly connects the information flow from the process block 303 to a process block 305 which results in the portable microprocessor 40 reading the information stored in the portable ID memory location 17. The solid information path shown between the process blocks 303 and 305 corresponds to a variation of the present embodiment wherein only when the portable unit 12 is first (initially) mated with a base communication 11 it will learn its code and store this code in the portable ID memory location 17, but upon subsequent mating of the portable unit 12 to any base communication unit no new code will be learned. This is contrasted with the dashed information flow path from the process block 303, which indicates an interim dashed process block 306 that provides for clearing whatever signals are stored in the portable ID memory location 17. By clearing the memory location 17, any prior ID code stored in the memory location 17 is erased and is replaced by an invalid ID code (zero) such that the portable communication unit 12 will be receptive to reading a new ID code into the memory location 17. After the execution of the process block 306 control again passes to the process block 305 where the portable microprocessor 40 reads the ID code in the memory location 17.

From the process block 305 control passes to the decision block 307 which determines if the read ID memory code in the location 17 corresponds to a proper portable ID memory code. If the decision block 307 determines that a proper memory code is already contained in the location 17, then the normal portable scan routine 200 is reimplemented. If this is not the case, then the information flow for the portable communication unit proceeds to a process block 308 in FIG. 4b wherein the portable microprocessor 40 reads whatever ID code information is then received on its ID terminal 42 from the base microprocessor 22.

While the portable microprocessor 40 implements the process steps 305 through 308, the base microprocessor proceeds from the delay step 304 to a process step 309 that essentially corresponds to reading out the base ID code stored in the memory location 16 and providing a corresponding ID code signal for transmission. This ID code signal is then transmitted to the base unit via the process step 310 via the ID connection line between the plug and socket assemblies to the ID terminal 42 of the portable microprocessor. The base microprocessor then proceeds from block 310 to another delay process block 311 and then on to a subsequent ID sending block 312 that corresponds to the block 310. From the process step 312, control of the base microprocessor then proceeds to the normal base scan routine 100.

The portable microprocessor, via the process block 308, reads the ID code received at its terminal 42, and then information flow passes to a decision block 313 which determines if this read ID code corresponds to an allowable portable microprocessor ID code. If so, information flow passes to a summing terminal 314 and then on to a process block 315 that stores this proper ID code in the memory location 17. If the decision block 313 does not verify that a proper ID code has been received at the terminal 42, control passes to a process block 316 which again attempts to read the ID code received on the terminal 42. This second time, the read ID code will correspond to the code sent for the second time by the base process block 312. Control from the process block 316 passes to the decision block 317 wherein if now a proper ID has been received by the microprocessor 40, control will pass to the terminal 314 to store this proper code in the portable ID memory location 17 via block 315. If the decision block 317 again does not identify the received ID code as a proper code, control passes to the normal portable scan subroutine 200. If desired, instead of control passing to the subroutine 200, control could pass to a halt mode process block which prevents any normal portable scanning operation via the link 15 until a proper code is read into and stored in the portable unit. From the process block 315, the portable microprocessor proceeds to read the ID code just stored in the portable memory ID location 17 via a process block 318. Control then passes to a decision block 319 by which the microprocessor 40 determines if this read ID code from the location 17 is a proper portable ID code. If not, control will pass to the normal portable scan subroutine 200. If the read portable ID is a proper ID code, control passes from the decision block 319 to a process block 320 which results in the transceiver 20 generating an alert tone via the speaker 22 to indicate the proper entry of an ID code into the portable ID memory location 17. Then control passes to the normal portable scan subroutine 200.

The flow charts in FIGS. 4a and 4b illustrate that in response to the mechanical connection of the portable and base communication units, the base microprocessor 22 is reset resulting in the sequential resetting of the portable microprocessor 40 and the attempted transmission of ID codes to the portable microprocessor via the ID connection line of the plug and socket assemblies 28 and 45. If the portable microprocessor 40 determines, via the decision block 307, that the portable communication unit should be reprogramed to a new portable ID code, then the code transmitted by the base microprocessor will be loaded into the portable ID code memory location 17 and an audible alert tone generated indicating the proper transfer of code to the portable communication unit. Then the base and portable communication units resume their scanning subroutines which result in full two way communications being enabled between the portable and base units when proper code correspondence of the codes stored in the base and portable units is determine by the microprocessors 22 and 40. Upon the establishment of proper communications via the wireless communication link 15, the portable communication unit 12 can access the telephone system network 15b via the communication link 15 and the base communication unit 11, whereas without the portable and base units having corresponding codes such access is prohibited.

Each of the blocks in the flow chart in FIGS. 4a and 4b can be readily implemented by standard programming of microprocessors and/or by conventional digital and analog circuits. Sending codes comprises merely recalling stored digital signals, and verifying if codes are proper or not merely comprises signal comparison with predetermined limits. Thus each individual block in FIGS. 4a and 4b can be readily implemented by a computer or by discrete circuitry.

It should be noted that essentially the present embodiment initiates the portable communication unit learning its code in response to a predetermined mechanical coupling connection being provided between the portable and base communication units. This mechanical connection comprises the selective mating together of plug and socket assemblies associated with the portable and base communication units, respectively, and providing said mechanical coupling by electrically interconnecting circuits between the base and portable units. The present embodiment provides for these plug and socket assemblies to include electrical contacts which provide an operative connection between a battery charging means in the base unit and a battery in the portable unit which supplies operative power to the portable unit at least when the portable unit housing is separated from the base unit housing. The plug and socket assemblies provide a direct mechanical connection comprising an electrical conductor path between the portable and base units over which the base communication unit 11 transmits an ID code to the portable communication unit 12, and according the embodiment shown in FIG. 1 the electrical path provided by this electrical conductor is separate from the battery charging electrical contacts which are included in the plug and socket assemblies 28 and 45.

Of course other configurations for transmitting the ID code from the base microprocessor to the portable microprocessor are possible. One such technique could comprise transmitting the ID code to be read into the portable microprocessor memory location 17 by having the the base communication unit 11 sending this code over the wireless communication link 15. However, requiring a direct mechanical connection between the base and portable communication units not only as a prerequisite to permit the portable unit to learn its code from the base unit but also for providing a mechanical code transmission path provides a more secure communication system. This is because the portable unit can only learn its ID code from the base unit by being physically connected thereto, thus eliminating the possibility of portable units which have not been physically mated to the base unit learning the predetermined portable ID code which will enable them to establish a communication link with the unit.

It should be noted that the present embodiment, via the solid connection between the process blocks 303 and 305 and the decision block 307 includes apparatus which prevents the portable communication unit from learning and storing a portable ID code sent by the base in response to the portable unit determining that the portable ID memory location 17 already has stored therein, prior to the mating of the assemblies 28 and 45, a proper portable ID code which will enable the portable unit to establish desired two way communications with a corresponding base unit via the communication link 15. Of course if the alternative process path including the process block 306 is utilized, then after each reset of the portable microprocessor 40 the portable ID memory location 17 will be permitted to accept received ID information sent to it from the base microprocessor via the ID terminals 24' and 42' of the plug and socket assemblies 28 and 45.

Refering to FIG. 5, a schematic diagram is shown which illustrates preferred configurations for the base and portable reset circuits 29 and 50. In FIG. 5 identical reference numerals are utilized to indicate the correspondence of elements in FIG. 5 with the elements in FIG. 1. It should be noted that the reset circuit 29, as shown in FIGS. 1 and 5, is connected between the base microprocessor ID terminal 24 and the base microprocessor reset terminal 23, while the portable reset circuit 50 is connected between the portable ID terminal 42 and the reset terminal 41. This is significant in that the reset circuits 29 and 50 work off of the same signal line used to transmit the ID code to the portable unit. This eliminates the need for additional reset lines forming separate plug and socket conductors since the reset information is sent on the same ID conductor path used for transmitting the ID code. Thus the reset circuits 29 and 50 distinguish between the transmitted ID code and the reset pulses for the base and portable microprocessors.

Preferably the present invention utilizes the reset circuits shown in FIG. 5 rather than having the base microprocessor 22 receive a reset pulse from a separate conductor path including an external plug terminal separate from terminals 24', 26' and 27' and then having the base microprocessor 22 provide a reset signal to the portable microprocessor 40 via an additional conductor path provided by the plug and socket assemblies. While each of these configurations is possible, the embodiment in FIG. 5 saves providing additional conductor paths in the plug and socket assemblies and therefore lowers the cost of the system and increases its reliability since fewer external plug in connections will have to be made.

The ID terminal 24 in FIG. 5 is connected to a control terminal 400 of a controllable series pass gate 401 that has one through input terminal connected to ground potential and the other through input terminal connected to a terminal 402. Series pass gates essentially respond to control voltages at their control terminal to either provide a direct connection between their series pass terminals or an open circuit connection between their series pass terminals. Such gates are well known. The terminal 402 is coupled to the base reset terminal 23 through a 10 microfarad capacitor 403 and is coupled to the B+ terminal 26 through a 560K (kilo) ohm resistor 404. The B+ terminal 26 is also connected to the reset terminal 23 through a 10K ohm resistor 405. The magnitude of the resistor 30 coupled between the base ID terminal 24 and terminal 27' in FIG. 5 is 82K ohms.

In FIG. 5 the reset circuit 50 is illustrated as comprising a controllable gate series pass 410 having its control terminal 411 directly connected to the portable microprocessor ID terminal 42 as well as one of its series input terminals. The other series terminal of the gate 410 is directly connected to the portable microprocessor reset terminal 41. The reset terminal 41 is connected to ground by the parallel combination of a 0.1 microfarad capacitor 412 and a 560K ohm resistor 413. The magnitude of the resistor 49 in FIG. 5 is 15K ohms.

The operation of the reset circuits 29 and 50 will now be discussed with respect to the waveforms shown in FIG. 6 which represent various signals produced by the circuitry in FIG. 5. This will illustrate how the reset circuits distinguish between reset pulses and ID code information which is provided on the conductor path between the ID terminals 24 and 42.

In FIG. 6, the signal waveform A is representative of the signal at the base ID terminal 24 and illustrates that prior to the time $t_0$, during which time the plug and socket assemblies 28 and 45 are disconnected, the voltage level at this terminal is ground due to the connection of the resistor 30. At the time $t_0$, the plug and socket assemblies 28 and 45 are mated and this results in a positive step occurring for the signal A due to the effect of the pull up resistor 49 which is connected to the positive portable battery voltage terminal 43' and which, after mating of the assemblies 28 and 45 is also connected to the B+ terminal 26 of the base communication unit. The magnitude of the resistors 49 and 30 result in the signal A having a magnitude of almost B+ after the time $t_0$.

The other signal waveforms shown in FIG. 6 correspond as follows to the signals provided by the circuitry in FIG. 5. The waveform B represents the signal at the portable ID terminal 42, the waveform C represents the signal at the portable reset terminal 41, the waveform D represents the signal at terminal 402 in the reset circuit 29, and the waveform E represents the signal at the base reset terminal 23. In FIG. 6 the vertical axes are magnitude, and the horizontal axes are time and are all shown with the same time scale.

The operation of the circuit in FIG. 5 is as follows. In response to the step increase in the signal A at the base ID terminal 24 at the time $t_0$ that the plug and socket assemblies are mated, a negative impulse is provided in the signal E at the base reset terminal 23 due to the gate 401 being turned on. The magnitude of the negative impulse is equal to the magnitude of positive voltage which previously existed at terminal 23. Assuming that a predetermined minimum time existed prior to $t_0$ during which a low signal was at terminal 24 (terminal 400), the voltage at terminal 23 would be the B+ voltage at terminal 26, and this creates a negative impulse having a magnitude equal to B+. This impulse exceeds the reset threshold level 420 shown in FIG. 6 and results in resetting the base microprocessor 22. Subsequently the voltage at the base reset terminal is returned to zero by the relatively rapid charging of the capacitor 403 by the resistor 405. At the time $t_0$ the signal B at the portable ID terminal 42 undergoes a slight downward shift in potential due to the voltage dividing effect of the resistors 49 and 30. Since this voltage shift is slight, there is no substantial change in the voltage at the portable reset terminal 41 since the gate 410, which was previously on, will remain on.

At a subsequent time $t_1$, the base microprocessor will respond to being reset by providing a low voltage signal pulse on the signal A at the base ID terminal. This pulse will overide any DC bias provided by the resistors 49 and 30 such that the signal A stays low for a 200 millisecond (MS) period until the time $t_2$. During this time of course the voltage at the portable ID terminal 42 (signal B) tracks the voltage at the base ID terminal (signal A), and such will be the case as long as the plug and socket assemblies 28 and 45 are connected. Also during this time the series gate 410 of the portable reset circuit 50 is now opened thereby permitting the voltage at the terminal 41 (signal C) to discharge through the slow time constant provided by the resistor 413 and the capacitor 412. Previously the gate 410 was open and thereby directly connected the high voltage at the terminal 42' to the reset terminal 41. As the voltage at the terminal 41 decreases eventually the signal C will fall below a reset threshold level 421 at which time the portable microprocessor 40 will be reset. This occurs somewhere between the times $t_1$ and $t_2$.

It should be noted that during the time duration $t_1$ through $t_2$, the gate 401 in the reset circuit 29 is open, but this does not result in any appreciable change in the signal voltage D at the terminal 402 since this results in the charging of the ten microfarad capacitor 403 through the 560K resistor 404 which results in a negligable increase in the voltage of the terminal 402 due to the relatively slow time constant of these charging elements. This is significant since at the time $t_2$ the base microprocessor 22 puts out a high pulse in signal A for a relatively short duration between the times $t_2$ and $t_3$. This high output results in turning the gate 401 on, but only a minor shift in the base reset voltage (signal E) is now provided since only a small amount of charging of the capacitor 403 occurred during the times $t_1$ through $t_2$. Thus during the times $t_1$ to $t_2$, the voltage at terminal 24 has not remained low for a sufficient minimum time duration such that in response to the next positive signal transition an impulse at terminal 23 would exceed the reset threshold 420. The same is true during the data transmission which occurs from $t_3$ to $t_4$.

At a subsequent time $t_3$, the base microprocessor stops putting out a high output and then provides a string of data comprising short duration syncronizing bits and data bits by which a specific ID code is outputted by the base microprocessor to the ID input terminal 42 of the portable microprocessor. In this manner the base microprocessor sends to the portable microprocessor a desired ID code for reading by the microprocessor 40 and eventual storage in the portable ID memory location 17. It is contemplated that the high-low and low-high transitions of voltage levels which comprise the data sent between the time $t_3$ and a subsequent end of data time $t_4$ occur sufficiently rapidly such that no appreciable voltage is allowed to accumulate at the terminal 402, since otherwise when the base ID terminal would return to a high voltage level an additional reset of the base microprocessor might occur. Also during the data sent between $t_3$ to $t_4$, the voltage level transitions occur sufficiently rapidly so that no appreciable drop is allowed to occur at the terminal 41, since otherwise an additional reset of the portable microprocessor might occur. During the times $t_3$ to $t_4$ the base microprocessor will output an ID code twice as per the flow chart in FIGS. 4a and 4b.

After the time $t_4$, the base microprocessor ID terminal 24 is open circuited resulting in a constant high voltage at this terminal due to resistor 49 and this voltage is maintained until a subsequent time $t_5$ at which time it is assumed that the plug and socket assemblies 28 and 45 are disconnected. Upon the disconnection of these assemblies, the signals A–E in FIG. 6 change as shown wherein after a substantial time duration of ten seconds, represented by the times $t_5$ through $t_6$, the voltage at the terminal 402 (signal D) has now achieved a value comparable to the B+ voltage such that upon subsequent turning on of the gate 401 the base microprocessor 22 will be reset by the occurrence of a negative impulse of sufficient magnitude at the reset terminal 23 of the microprocessor 22.

Essentially the reset circuit 29 corresponds to reset circuitry which is coupled between the base ID information line and the microprocessor reset terminal for providing a reset pulse to the microprocessor in response to an initial predetermined signal transistion on the mechanical ID information line (the connection between terminals 24 and 42) while ignoring sequential substantially identical signal transitions which occur on the ID line during the subsequent transmission of data information. This is accomplished by having the reset circuitry ignore these subsequent signal transitions unless they are preceded by the existence of a predetermined voltage level (low voltage) on the information line which exists for a duration which is substantially longer than the time durations which precede similar transitions during the transmission of said data during which time said predetermined voltage level exists.

The matable plug and socket assemblies 28 and 45 together comprise a matable connector assembly that couples the base microprocessor 22 to the portable microprocessor 40 by providing coupling between the base and portable ID terminals 24 and 42 and provides said initial signal transition at $t_0$ on an ID line in response to the initial coupling of said base and portable ID terminals. The reset circuit 29 more specifically includes a capacitor 403 and a long time constant charging resistance 404 which together provide said base microprocessor reset pulse in response to pulse transitions on the ID line similar to said initial pulse transistion whenever they are preceded by a substantially long time duration during which the voltage level on the ID line is maintained at a predetermined level. Subsequently during data transmission on said ID line, the voltage level on the ID line is prevented from existing for this substantially long time duration while similar signal transitions are provided for data transmission.

The reset circuit 29 also includes a short time constant charging resistance comprising the 10K resistor 405 for essentially terminating said reset pulse prior to transmission of data on the ID line. The reset circuit 29 utilizes the resistor 30 which provides said predetermined signal level for said substantially long time duration until the mating of the plug and socket assemblies 28 and 45. Thus resistor 30 can be considered part of the reset circuit 29.

The reset circuit 50 is characterized by a resistor-capacitor network which provides a portable reset pulse in response to a received signal on the ID line comprising a predetermined voltage level which exists for at least a minimum time duration. This voltage level is followed by data wherein during the transmission of said data on said ID line similar voltage levels are only provided with durations which are substantially shorter thus preventing the data from causing additional resetting of the portable microprocessor 40.

It should be noted that while a specific embodiment of the present invention is described herein, many variations of this embodiment may exist which still embrace the basic principles disclosed herein. Obviously while the present invention relies on the mechanical connection of the base and portable ID lines to provide the reset pulse to the base microprocessor which in turn provides a reset pulse to the portable microprocessor, other techniques for initiating the resetting of the base microprocessor can be utilized. In addition, while the present invention comprises sending ID information over the mechanical ID line to the portable microprocessor such that the portable communication unit will learn its ID code, other paths for the transmission of this ID information could be utilized including the wireless communication link 15. While I have shown and described specific embodiments of this invention, further modifications and improvements will occur to those skilled in the art. All such modifications which retain the basic underlying principles disclosed and claimed herein are within the scope of this invention.

What is claimed:

1. A microprocessor reset system comprising:
a microprocessor having a reset input terminal,
an information line coupled to said microprocessor on which said microprocessor will transmit information data, and
reset means coupled between said information line and said microprocessor reset terminal for providing a reset pulse to said microprocessor in response to an initial predetermined signal transition on said information line which is preceded by the existence of a predetermined voltage level which exists for a predetermined minimum duration of time, said reset circuit effectively ignoring subsequent substantially identical signal transitions which occur on said information line during said transmission of information data unless they are directly preceded by the existence of said predetermined voltage level which exists for at least said minimum duration of time.

2. A microprocessor reset system according to claim 1 which includes a matable plug and socket assembly which when mated together provides a mechanical connection of said information line to a device external to said microprocessor, the mating of said plug and socket assembly also providing said initial predetermined signal transition which results in said microprocessor reset pulse.

3. A microprocessor reset system according to claim 2 wherein said reset means comprises a capacitor coupled between a first series terminal of a controllable series pass gate and said reset terminal, a first resistor means coupled from said reset terminal to a first predetermined reference voltage, a second resistor means coupled between said first series terminal and a reference voltage, and a control terminal of said gate coupled to said information line, said gate, when activated by a predetemined control voltage at its control terminal, providing at said reset terminal a second predetermined voltage different from said first predetermined reference voltage, said second voltage resetting said microprocessor.

4. A microprocessor reset system according to claim 3 wherein said series pass gate comprises a second series terminal coupled to a reference voltage different from said first reference voltage and wherein said second resistor means is coupled to said first reference voltage.

5. A microprocessor reset system according to claim 4 wherein said second resistor means has a magnitude substantially greater than said first resistor means.

6. A microprocessor reset system according to claim 1 which includes a matable connector means coupling said microprocessor to a device external to said microprocessor and also coupled to said information line for providing said initial signal transition in response to the mating of component parts of said matable connector means.

7. A microprocessor reset system according to claim 6 which includes circuitry in said reset means which provides said predetermined voltage level which precedes said signal transistion until the mating of the component parts of said matable connector means.

8. A microprocessor reset system according to claim 7 wherein said reset means includes a capacitor which responds to said predetermined pulse signal transitions to provide said reset pulse, and wherein said reset means includes a long time constant charging resistance means which together with said capacitor reenables said capacitor to produce said reset pulse in response to said pulse transitions if at least a minimum time duration elapses between the sequential occurrence of said pulse transitions.

9. A microprocessor reset system according to claim 6 wherein said reset circuit includes a short time constant charging resistance means which, in combination with said capacitor results in terminating said reset pulse prior to the transmission of said information.

10. A microprocessor reset system according to claim 1 wherein said transmitted information on said information line consists of substantially identical signal transitions to said initial signal transition but which are preceded by substantially similar predetermined voltage levels that exist for less than said minimum duration, whereby said microprocessor is not reset by said transmitted information generated by the microprocessor.

11. A microprocessor reset system according to claim 10 which includes a second microprocessor which receives said transmitted information on said information line and is reset in response to a portion of this information.

12. A microprocessor reset system according to claim 11 which includes a second reset means coupled between said information line and a reset terminal of said second microprocessor, said second reset circuit providing a reset pulse to said second microprocessor in response to the occurrence, on said information line, of a predetermined signal level for at least a minimum time duration.

13. A microprocessor reset system according to claim 12 wherein said second reset means includes a capacitor coupled in parallel with a resistor to said second microprocessor reset terminal.

14. A microprocessor reset system according to claim 13 wherein said second reset means includes a series pass gate coupled to between said information line and said second microprocessor reset terminal.

* * * * *